(12) United States Patent
Lied

(10) Patent No.: US 6,423,360 B1
(45) Date of Patent: Jul. 23, 2002

(54) BEVERAGE FOR ANIMALS

(76) Inventor: Axel Lied, Ginsterweg 2, D-63874 Dammbach (DE)

( * ) Notice: Subject to any disclaimer, the term of this patent is extended or adjusted under 35 U.S.C. 154(b) by 0 days.

(21) Appl. No.: 09/786,453

(22) PCT Filed: Aug. 27, 1999

(86) PCT No.: PCT/DE99/02749

§ 371 (c)(1),
(2), (4) Date: Mar. 2, 2001

(87) PCT Pub. No.: WO00/13527

PCT Pub. Date: Mar. 16, 2000

(30) Foreign Application Priority Data

Sep. 3, 1998 (DE) .......................................... 198 40 188

(51) Int. Cl.⁷ ................................................. A23K 1/18
(52) U.S. Cl. ....................... 426/590; 426/646; 426/648; 426/650; 426/655; 426/805
(58) Field of Search ................................. 426/590, 650, 426/648, 655, 805, 646

(56) References Cited

FOREIGN PATENT DOCUMENTS

| EP | 0040654 | * | 12/1981 |
| FR | 2715539 | * | 8/1995 |
| GB | 925071 | * | 5/1963 |
| GB | 2225206 | * | 5/1990 |
| WO | 9528854 | * | 11/1995 |

OTHER PUBLICATIONS

"Nutrition Requirement of Dogs", National Research Council, Publisher: National Academy Press, Wash. D.C. p. 7–15 and 44–45, 1985.*

* cited by examiner

*Primary Examiner*—C Sayala
(74) *Attorney, Agent, or Firm*—Edwin D. Schindler

(57) ABSTRACT

An animal food includes an aromatic substance identical with that of meat, offals of animals or a combination thereof, and which is an extract from the meat, offals or the combination thereof. An extract of vegetables is also included in the animal food. Water is added for forming an animal beverage with the percentage of the extracts of meat, offals, vegetables or a combination thereof being no more than 8% of the total weight of the animal beverage.

11 Claims, No Drawings

BEVERAGE FOR ANIMALS

BACKGROUND OF THE INVENTION

1. Technical Field of the Invention

This invention relates to animal food, especially for dogs and/or cats, with aromatic substances which are identical with those of meat and/or offals of animals and which are extracts from the meat and/or offals of animals, with extracts of vegetables being added additionally.

2. Description of the Prior Art

Like humans, many animals also need a regular supply of liquids to ensure that their organism functions. Thus, dog and cat owners provide dishes with water for their quadruped friends; however, such water is frequently not wanted or not taken in sufficient quantities. Such behavior is by no means surprising if one takes into account that many people would also drink a lot less liquid if their only available beverage were water. A protein drink as a substitute food for pets is known from GB 2 225 206 A, with the ingredients being added in balanced amounts to water as the carrier substance.

SUMMARY OF THE INVENTION

Thus, the invention is based on the task of providing a beverage which animals like to drink even in greater amounts and which accordingly ensures a sufficient supply of liquids.

This task is solved according to the invention by the animal food being a beverage for animals based on water and the percentage of the extract of meat and/or offals and/or vegetables amounting, overall, to a maximum of 8% by weight of the beverage.

It is the basic idea of the invention that many pets—especially carnivores, like dogs and cats, particularly like the taste of meat or offals. Thus, the beverage for animals to be provided with the corresponding flavor through aromatic substances which are identical to meat or offals. Especially effective for animals, as well, the meat or offals aroma can be obtained by an extract. If one takes into account that animals, in their food intake, are guided—like humans—by their sense of taste and thus will frequently ingest those foods whose nutrients they require, it is a major advantage for balanced nutrition if—together with such food and in addition to the aromatic substances—the natural nutrients therein will be ingested. Precisely this objective will be most beneficially achieved by aromatic substances obtained from a meat or offals extract and introduced into the beverage according to the invention. Suitable for this is the meat of classical animals for nutrition, such as poultry, pork, beef, lamb, or also fish. Especially suitable offals are the heart, the stomach and the liver of those animals.

Some types of vegetables, especially soy, also contain aromatic substances which are appreciated by dogs or cats. Since, moreover, meat is relatively expensive compared to vegetables, a vegetable extract is to be additionally included. The nutrients contained therein can appropriately supplement those contained in a meat extract.

To provide primarily water to the animal, the percentage of the meat, offals, or vegetable extract is a maximum of 8 percent by weight of the beverage.

Aside from ensuring the ingestion of liquids, the beverage for animals according to the invention can additionally contribute to animal nutrition if it provides minerals, fibers, trace elements or vitamins which can have a beneficial effect even in relatively small amounts. Some of these substances are already contained in extracts from meat, offals or vegetables and thus need not be separately added. In contrast, vitamins can be lost in the manufacturing process so that a corresponding addition of suitable amounts to the beverage is deemed sensible.

Experience has shown that dogs and cats are suspicious of turbid liquids, which are thus frequently refused. For this reason, the beverage for animals according to the invention shall preferably be clear (i.e., transparent or translucent.).

Another object of the invention is a method for the manufacture of a beverage for animals. This comprises that meat, offals or vegetables are boiled in water, thereafter being removed from the water, and the remaining broth to be processed further to a beverage. During the cooking process, aromatic substances and nutrients are extracted from the meat, the offals or the vegetables; after their subsequent removal, said aromatic substances and nutrients remain in the broth to form the basic aroma of the beverage. However, since the energy required for boiling entails considerable costs and is approximately proportional to the amount of water boiled, the meat is preferably cooked with less amount of water and the broth is subsequently diluted with water.

To obtain the intended clear, translucent consistency of the beverage, turbid substances and sediments are extracted from the broth, preferably by filtration, so that they will no longer cause any turbidity in the beverage.

A maximum of 125 g of meat, vegetables or offals are required per liter of beverage to ensure a sufficient character of a beverage. However, this amount can vary greatly, depending on the consistency, especially the surface of the starting materials.

As a rule, a beverage manufactured according to the described method will already have sufficient amounts of protein and trace elements. In contrast, and depending on the area of the beverage's application, the addition of minerals and fibers or vitamins seems indicated to supplement daily nutritional requirements.

DETAILED DESCRIPTION OF A PREFERRED EMBODIMENT

Further details, characteristics and benefits of the invention can be taken from the following descriptive part in which one example of an embodiment is described in more detail.

For manufacture, cold water is put into pots with, for example, two chicken hearts per liter; it is brought to a boil, skimmed and left to simmer for another 20 minutes. It is also possible to put the cooking substance into boiling water, with otherwise unchanged procedure. The hearts are then removed, the broth is filtered, vitamin-enriched and finally left to cool. Under the condition of sufficiently fine filtration, one will thus obtain a transparent, nearly clear liquid without suspended or turbid substances, the liquid being largely neutral in odor. It contains protein, trace elements and also vitamins due to their addition. In this composition, the beverage will be vacuum-packed and offered for sale. The meat used for its manufacture can possibly be sold separately.

As a whole, a beverage for animals is obtained which is characterized by excellent digestibility and high acceptance by the animal, and which is also intensive in flavor, as well as stimulating the appetite. Due to these properties, it will contribute to a pet's healthy nutrition, especially due to a higher ingestion of liquid. No artificial colorings and preservatives will be used, nor any table salt (NaCl); thus, their known detrimental effects will be avoided.

What is claimed is:

1. An animal beverage, comprising:

an aromatic substance having a taste which is substantially the same as that of meat, offals of animals or a combination thereof, and which is an extract from the meat, offals or the combination thereof;

extracts of vegetables; and, water for forming an animal beverage with the percentage of said extracts of meat, offals, vegetables or a combination thereof being no more than 8% of the total weight of said animal beverage.

2. The animal beverage according to claim 1, further comprising a mineral.

3. The animal beverage according to claim 1, further comprising a vitamin.

4. The animal beverage according to claim 1, further comprising fiber.

5. The animal beverage according to claim 1, further comprising a trace element.

6. The animal beverage according to claim 1, wherein said animal beverage is a clear liquid.

7. A method for manufacturing an animal beverage, said animal beverage comprising:

an aromatic substance having a taste which is substantially the same as that of meat, offals of animals or a combination thereof, and which is an extract from the meat offals or the combination thereof;

extracts of vegetables; and, water for forming an animal beverage with the percentage of said extracts of meat, offals, vegetables or a combination thereof being no more than 8% of the total weight of said animal beverage, said method for manufacturing said animal beverage comprising the steps of:

cooking said extracts of meat, offals, vegetables or a combination thereof in water;

removing said extracts of meat, offals, vegetables or a combination thereof from the water, leaving a broth following said removing step; and, mixing said broth with water thereby producing said animal beverage.

8. The method for manufacturing an animal beverage according to claim 7, further comprising the step of filtering the broth prior to carrying out said mixing step.

9. The method for manufacturing an animal beverage according to claim 7, further comprising the step of adding at least one mineral to said animal beverage.

10. The method for manufacturing an animal beverage according to claim 7, further comprising the step of adding at least one vitamin to said animal beverage.

11. The method for manufacturing an animal beverage according to claim 7, further comprising the step of adding at fiber to said animal beverage.

\* \* \* \* \*